July 9, 1940. P. F. HAWLEY 2,206,892
ELECTRICAL LOGGING OF EARTH FORMATIONS

Original Filed June 17, 1938 3 Sheets-Sheet 1

INVENTOR
Paul F. Hawley
BY
Geo. L. Parkhurst
ATTORNEY

July 9, 1940.   P. F. HAWLEY   2,206,892
ELECTRICAL LOGGING OF EARTH FORMATIONS
Original Filed June 17, 1938   3 Sheets-Sheet 2

INVENTOR
Paul F. Hawley
BY
ATTORNEY

Patented July 9, 1940

2,206,892

UNITED STATES PATENT OFFICE 2,206,892

ELECTRICAL LOGGING OF EARTH FORMATIONS

Paul F. Hawley, Tulsa, Okla., assignor to Stanolind Oil and Gas Company, Tulsa, Okla., a corporation of Delaware Application June 17, 1938, Serial No. 214,270
Renewed February 5, 1940

19 Claims. (Cl. 175—182)

This invention relates to the electrical logging of earth formations and more particularly to a method and apparatus for making a record of the discontinuities in the walls of a well or bore hole due to the various earth strata traversed thereby.

A number of methods of making a log of the strata in a well are known in the art and among these methods are those involving the measurement of the specific resistivities of the strata at various levels by means of electrodes lowered into the well when the latter is filled with a fluid.

The theoretical considerations underlying these methods are well-known to those skilled in the art and will not be given here. It may be stated, however, that the resistance of the ground to a current of electricity flowing through it from an electrode depends in large measure upon the specific resistivity of the ground in the immediate vicinity of the electrode. Since oil or gas sands have a relatively high specific resistivity and water-bearing sands a relatively low specific resistivity, by passing such an electrode through a bore hole and measuring the specific resistivity a log may be made of the formations at various depths.

The principal utility of the records obtained by these known methods lies in the correlation of the records from a number of wells in a given vicinity so as to yield information as to the subsurface geological structure in that vicinity. These records are usually difficult to correlate because the electrical variations obtained due to discontinuities in the formations traversed are quite gradual and of rather small amplitude, and thus fail to provide a well-marked indication of the depth at which these discontinuities exist.

It is an object of my invention to provide a method and apparatus by which an extremely clear indication of the location of the discontinuities between strata traversed by a well which have different resistivity characteristics may be obtained. Another object of my invention is to provide a novel and rapid method of electrically logging wells which gives a record of the formations encountered in a well suitable for correlation purposes. Further objects will be apparent from the following detailed description read in connection with the drawings in which.

Figure 1:
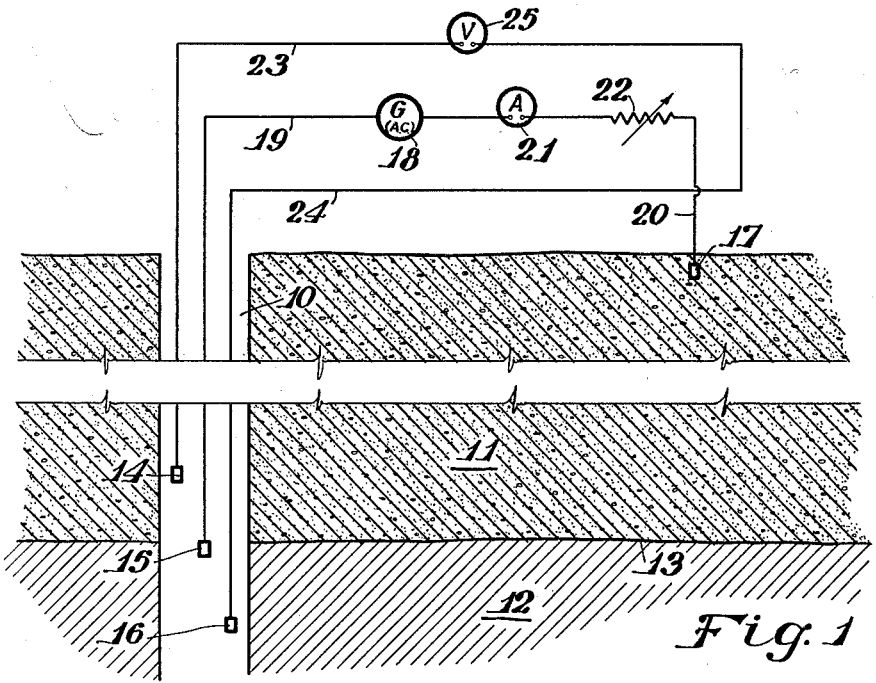
Figure 1 shows a schematic view of one form of apparatus embodying my invention.

I have found that the discontinuities in the walls of an uncased well due to the different strata penetrated thereby can be located very accurately by passing an electrical current through the earth between an electrode in the well and a grounded electrode at a distance therefrom and measuring and recording the potential difference between electrodes located above and below the current electrode within the well. My method may best be described in connection with Figure 1 in which an uncased well 10 penetrates formations 11 and 12 having an interface 13.

The logging apparatus includes an array of three vertically-spaced electrodes 14, 15 and 16, of which the intermediate electrode 15 is a current electrode and the uppermost and lowermost electrodes 14 and 16, respectively, are potential electrodes. When well 10 is filled with a fluid such as water or drilling mud, potential electrodes 14 and 16 may be made of metal or, preferably, are of the porous pot type, but when well 10 is dry at the levels which are to be logged, they can be of a type which makes direct contact with the walls of the well. Current electrode 15 is preferably made of metal. A second current electrode 17 is located in electrical contact with the earth at a distance from electrode 15, preferably at the surface of the earth and spaced from the top of well 10 a distance at least ten times that between adjacent electrodes within the well. If desired a number of such grounded current electrodes can be used. Electrodes 15 and 17 are connected to a source of electromotive force 18 by means of conductors 19 and 20, respectively, so that an electrical current can be passed through the earth between them. The source of electromotive force 18 can be of either the direct or alternating current type. For most purposes alternating current is preferred in order to avoid polarization at electrodes 14 and 16 when porous pots are not used. The same result may be obtained by the use of commutated direct current, as will be hereinbelow described in connection with Figure 2. When alternating current is employed, frequencies ranging from about 20 to about 100,000 cycles per second are suitable. Ammeter 21 and variable resistance 22 are also included in this circuit, but they are not an essential part of my invention and can be omitted.

Electrodes 14 and 16 are connected by means of conductors 23 and 24 respectively to an instrument 25 for measuring and recording the potential difference between them. Instrument 25 can be a conventional voltmeter of the direct or alternating current type, and is preferably capable of measuring both positive and negative values of potential difference. Ammeter 21 and instrument 25 can suitably be replaced by a single ratio type meter such as a differential wattmeter as shown in Figure 3. Conductors 19, 23 and 24 are preferably included in the usual manner in the cable which is used to raise and lower the array of electrodes as hereinafter described in connection with Figure 2. The spacing between electrode 15 and electrodes 14 and 16 may be from about 1 foot to about 20 feet or more, depending upon the degree of detail desired, and preferably electrodes 14 and 16 are equidistant from electrode 15, although some of the advantages of my invention are retained when these distances are not equal.

In logging a well according to my invention, the array of electrodes is lowered into the well while an electrical current is passed between electrodes 15 and 17 and the potential difference between electrodes 14 and 16 is measured by means of instrument 25 and recorded for various levels of electrode 15. Ordinarily the array of electrodes is continuously lowered and a continuous record made, but satisfactory results can be obtained by lowering the array a short distance, taking a reading, and repeating these operations. It is apparent that the same results can be obtained by raising the array, and runs can be made in both directions in order to check results.

It is well recognized that when an electrical current is passed through the earth between an electrode in a homogeneous earth formation and a distant electrode, the current produces equipotential surfaces surrounding the former electrode which are approximately spherical in shape, so that under these conditions when electrodes 14 and 16 are equidistant from electrode 15, the potential difference between them will be zero. However, if the array is lowered so that electrode 16 approaches a stratum of different resistivity the equipotential surface will be distorted and a potential difference will exist between electrodes 14 and 16 which is measured by instrument 25. When the array is further lowered to the position shown in Figure 1 with electrode 15 opposite the interface 13 between two formations 11 and 12 of different resistivities, the potential difference between electrodes 14 and 15 will again become approximately zero for the reason that the value of the current in each formation will vary inversely as the resistivity, thus producing the same potential difference between electrodes 14 and 15 as between electrodes 16 and 15. As the array is further lowered the potential difference again increases and reaches a maximum when electrode 14 is at the interface 13 and then decreases to a value approaching zero. Since the total resistance between electrodes 15 and 17 depends in large measure upon the resistivity of the formation adjacent electrode 15, the value of the current flowing between these electrodes will vary considerably as electrode 15 passes down the well, and it is preferred to maintain this current at a substantially constant value by means of ammeter 21 and variable resistance 22, or to use a ratio meter as shown in Figure 3. It is understood that the only reason for keeping the current constant in logging a well is to obtain records which are most readily correlatable with other logs.

Figure 2:
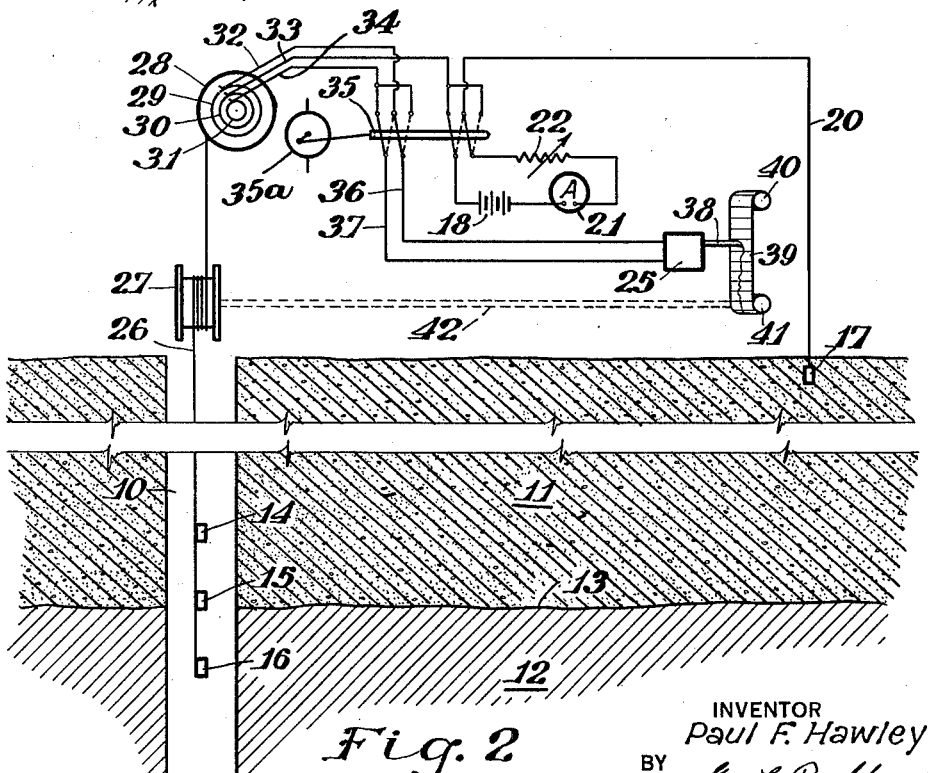
Figure 2 shows a schematic view illustrating a modified form of apparatus embodying my invention which utilizes commutated direct current.
Figure 3:
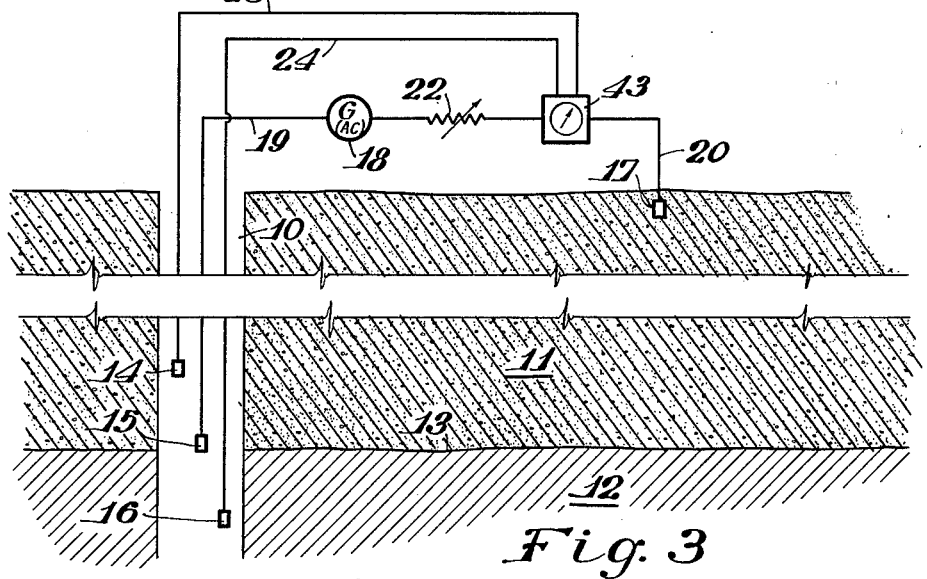
Figures 3 and 4 show schematic views of other forms of apparatus embodying my invention.

Referring now to Figure 2, in which a modified form of apparatus according to my invention is shown, an array of three vertically-spaced electrodes 14, 15 and 16 is lowered into well 10 by means of cable 26, which passes around measuring spool 27 and is normally wound upon drum 28. Conventional means (not shown) are used to rotate drum 28 and thus control the raising and lowering of the array of electrodes within well 10. Cable 26 contains three insulated electrical conductors leading from electrodes 14, 15 and 16 to slip rings 29, 30 and 31, respectively, on drum 28. Brushes 32, 33, and 34 contact slip rings 29, 30 and 31, respectively, and are connected to a double reversing switch 35 which is capable of being thrown at definite intervals, e. g., 1 to 100 times per second, from one position to the other by well-known means such as electric motor 35a, which is arranged to operate switch 35 by a crank mechanism. Reversing switch 35 can suitably be of the drum type. When switch 35 is in the position shown brushes 32 and 34 are connected by means of conductors 36 and 37, respectively, with instrument 25, which is suitably a recording type of voltmeter having a pen arm 38 for making a record on record strip 39. If desired the recording system of instrument 25 can be photographic in nature, and record strip 39 a light-sensitive film. Brush 33 is connected to battery 18, the other pole of which is connected through ammeter 21, variable resistance 22, switch 35 and conductor 20 to electrode 17, which is grounded at a distance from electrode 15, as hereinabove described in connection with Figure 1.

When reversing switch 35 is in the position shown the circuit is exactly the same as that in Figure 1, but when this switch is in its other position as indicated by the dotted lines, the polarity of battery 18 is reversed and the connections between electrodes 14 and 16 and instrument 25 are simultaneously reversed. In this way polarization effects at the electrodes cancel out while the direction of the potential difference measured by instrument 25 is maintained unchanged.

Record strip 39 is supplied by spool 40 and wound upon spool 41, which is actuated by a clock mechanism or rotated in synchronism with measuring spool 27 by well-known means, such as gears or Selsyn motors, represented by dotted lines 42. In this way a record is obtained having the potential differences plotted directly against the depth of electrode 15 in the well.

Figure 3 shows schematically an apparatus similar to that of Figure 1, but employing a ratio type meter 43 in place of ammeter 21 and instrument 25. By using an instrument of this type, such as a differential wattmeter, which measures the ratio of voltage to current, it is unnecessary to adjust the current to compensate for variations which would normally occur as the electrodes were lowered. This apparatus may be used with either direct or alternating current and gives both positive and negative readings, depending upon the direction of the potential difference supplied to meter 53. Preferably a meter of this type is used which is arranged to give a record plotted directly against depth as hereinabove described.

Figure 4:
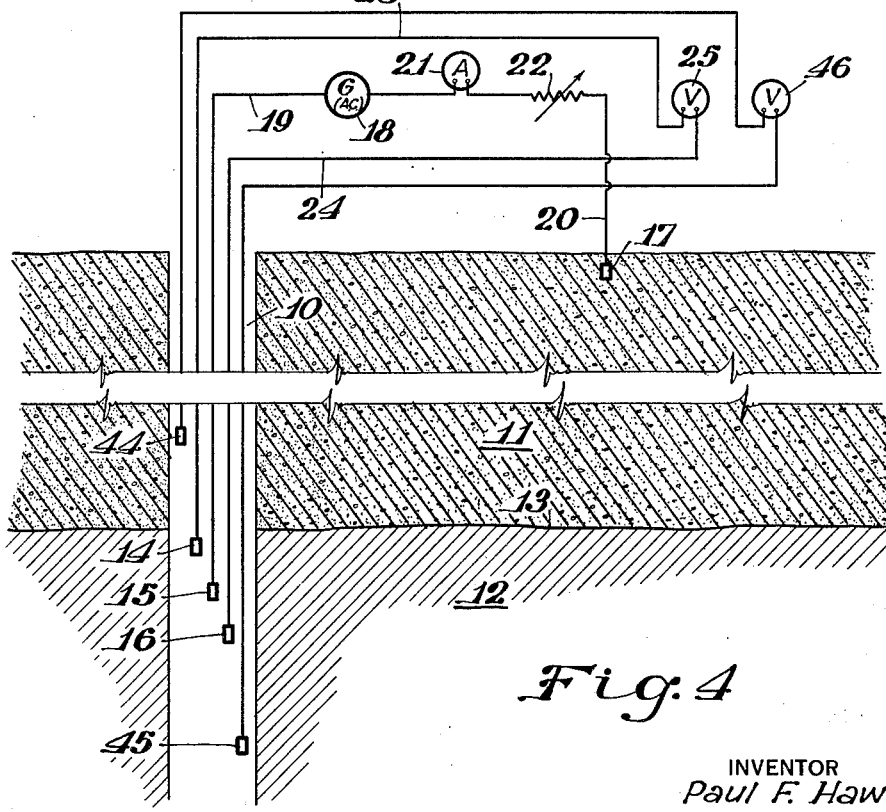

Figure 4 represents a further modification of apparatus suitable for practicing my invention. An electrical current supplied by a source of electromotive force 18 is passed through the earth between electrode 15 in the well and a distant grounded electrode 17. However instead of a single pair of potential electrodes spaced above and below electrode 15, two pairs of such electrodes are provided, electrodes 14 and 16 being relatively close to electrode 15, and electrodes 44 and 45 being relatively distant therefrom. Instruments 25 and 46 are connected across electrodes 14 and 16 and electrodes 44 and 45, respectively, in order that measurements of the potential differences across these pairs of electrodes may be obtained as described above. Electrodes 14 and 16 are preferably from about 1 to about 5 feet and electrodes 44 and 45 from about 10 to about 30 feet from current electrode 15. I am able by this means to obtain a detailed log of a well from instrument 25 and simultaneously a log from instrument 46 which will clearly show major discontinuities without being influenced by small irregularities in the formations traversed by the array of electrodes. It is apparent that by the use of a suitable switch, instrument 46 may be omitted and instrument 25 employed to measure the potential difference across the two pairs of electrodes alternately, and of course this can be done continuously.

Figure 5:
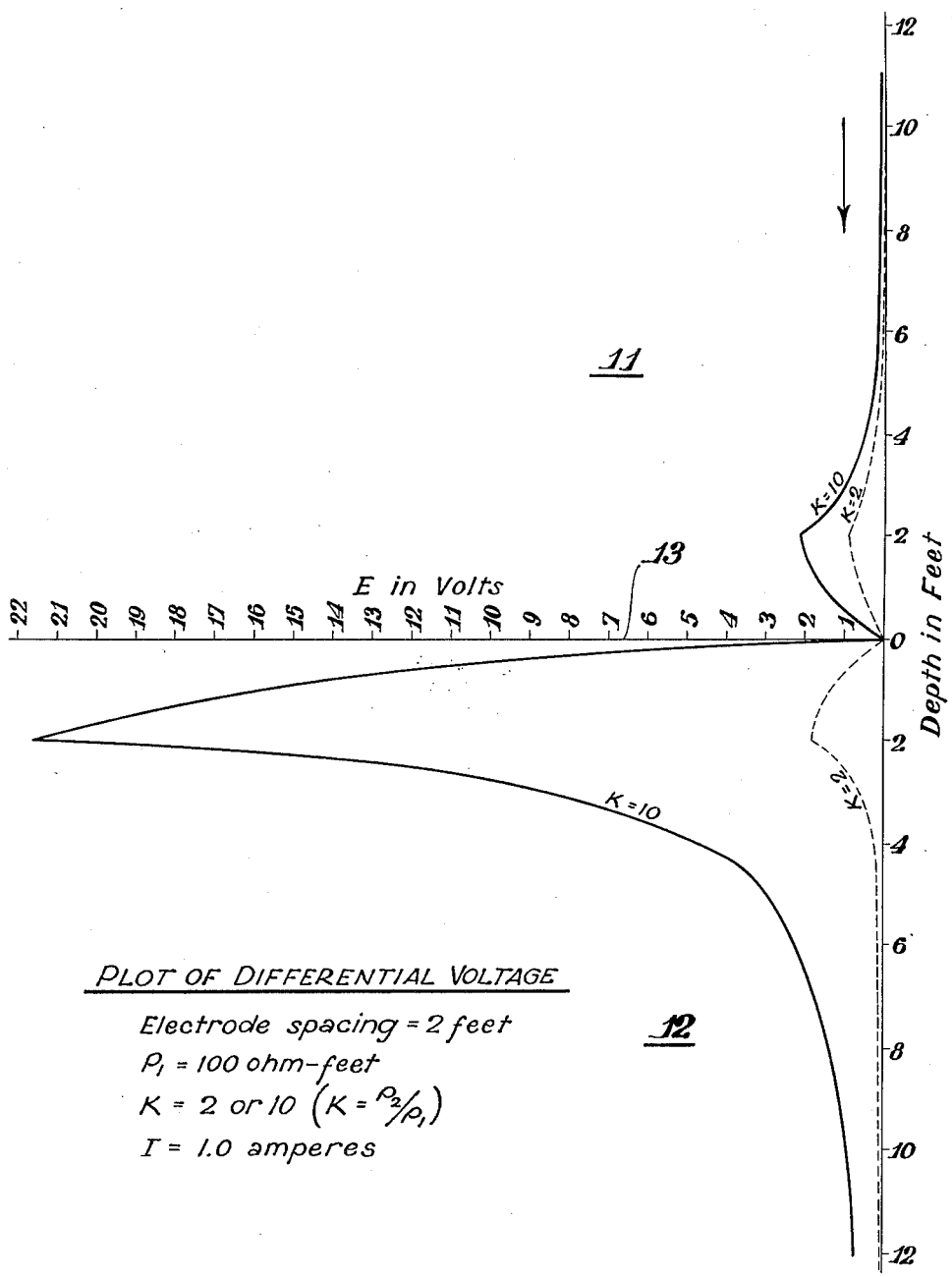
Figure 5 is a plot showing in an idealized manner the type of record which can be obtained by my invention.

The type of record obtained may be seen in idealized form in Figure 5 which shows the curve which is obtained by plotting the theoretical potential difference E existing between electrodes 14 and 15 against the position of electrode 15 as the array of electrodes two feet apart are lowered into well 10 through a formation 11 having a specific resistivity $\rho_1$ of 100 ohm-feet into a formation 12 having a specific resistivity $\rho_2$, and the current flowing through electrode 15 is maintained at 1 ampere. For convenience, the interface 13 between formations 11 and 12 is shown as zero feet, although these formations may actually be hundreds or thousands of feet below the surface of the earth. The solid curve gives values for the various depths of electrode 15 when K, i. e., the ratio of $\rho_2$ to $\rho_1$, is 10 and the dotted curve when it is 2. In either case a discontinuity is clearly marked as the point at which E approaches zero abruptly between its maximum deflections. The curve will be on one side of the zero axis when electrode 15 passes into a formation of high resistivity and on the opposite side when electrode 15 passes into a formation of lower resistivity. Furthermore, the maximum deflections are obtained when electrode 15 is a levels the same distance above and below the interface 13 as electrodes 14 and 16 are from electrode 15, so that the interface 13 is clearly marked. Obviously, in many cases the interface between formations is not as sharply defined as has been assumed in the idealized case shown in Figure 5, so that deviations from the ideal are obtained in practice, but the curves obtained in logging wells according to my invention approach the theoretical sufficiently to allow greatly improved correlation of the records from different wells as compared with prior methods.

The occurrence of the above-mentioned maximum deflections and minimum readings in passing from formation 11 to formation 12 can be demonstrated theoretically by means of the following equations in which:

E=the potential difference between electrodes 14 and 16.
I=the number of amperes passing through electrode 15.
$\rho_1$=the specific resistivity of formation 11 in ohm-feet.
$\rho_2$=the specific resistivity of formation 12 in ohm-feet.
K=the ratio of $\rho_2$ to $\rho_1$.
a=the distance between electrodes 14 and 15, and 15 and 16 in feet.
x=the distance between electrode 15 and the interface 13 in feet.

There are four cases which must be considered, viz.—

Case I—when electrode 15 is above the interface and $x>a$:
$$E=-\frac{I\rho_1}{4\pi}\left[\frac{(K-1)(2a)}{(K+1)(4x^2-a^2)}\right]$$

Case II—when electrode 15 is above the interface and $x<a$:
$$E=-\frac{I\rho_1}{4\pi}\left[\frac{(K-1)(2x)}{(K+1)(2ax+a^2)}\right]$$

Case III—when electrode 15 is below the interface and $x<a$:
$$E=-\frac{I\rho_1}{4\pi}\left[\frac{K(K-1)(2x)}{(K+1)(2ax+a^2)}\right]$$

Case IV—when electrode 15 is below the interface and $x>a$:
$$E=-\frac{I\rho_1}{4\pi}\left[\frac{K(K-1)(2a)}{(K+1)(4x^2-a^2)}\right]$$

It will be noted from the equation for Case I that as $x$ diminishes and approaches $a$ in value, i. e., as electrode 16 approaches the interface 13, an increasing negative value is obtained for E, and that when $x$ is equal to $a$, the equations for E are identical in Cases I and II. Similarly, it is apparent that E becomes zero when $x$ is zero as shown by the equations for both Cases II and III, and that a maximum negative value, K times the one above mentioned, is obtained when electrode 15 is adjacent formation 12 and $x$ is equal to $a$, as is shown by a consideration of the equations for Cases III and IV.

From the above description it may be seen that I have provided an improved method and apparatus for electrically logging the discontinuities in the walls of an uncased well and producing clear and easily correlatable records thereof. Although I have described my invention in connection with certain specific embodiments thereof, I do not desire to be limited thereto but only by the scope of the following claims.

I claim:

1. The method of logging earth formations traversed by a well which comprises passing an electrical current through the earth between an electrode in said well and a distant grounded electrode, and measuring and recording the potential difference between points above and below said electrode in said well.

2. The method of logging earth formations traversed by a well which comprises passing an alternating electrical current through the earth between an electrode in said well and a distant grounded electrode, and measuring and recording the potential difference between points fixed distances above and below said electrode in said well.

3. The method of logging earth formations traversed by a well which comprises passing an alternating electrical current through the earth between an electrode in said well and a distant grounded electrode, and measuring and recording the potential difference between points fixed equal distances above and below said electrode in said well.

4. The method of logging earth formations traversed by a well which comprises passing an alternating electrical current through the earth between an electrode in said well and a distant grounded electrode, measuring and recording the potential difference between electrodes above and below said electrode in said well, and repeating these steps at different levels in said well, whereby a log indicative of the discontinuities in the electrical properties of the strata penetrated by said well is obtained.

5. The method of logging earth formations traversed by a well which comprises changing the level of an array of at least three vertically-spaced electrodes into said well, passing an electrical current through the earth between an intermediate electrode and a distant grounded electrode, and measuring and recording the variations in the potential difference between electrodes in said array above and below said intermediate electrode, whereby a log indicative of the discontinuities in the electrical properties of the strata penetrated by said well is obtained.

6. The method of logging earth formations according to claim 5 wherein said electrical current is direct current.

7. The method of logging earth formations according to claim 5 wherein said electrical current is alternating current.

8. The method of logging earth formations traversed by a well which comprises lowering an array of five vertically-spaced electrodes into said well, one pair of said electrodes being spaced a relatively small distance above and below the intermediate of said electrodes and a second pair of said electrodes being spaced a relatively large distance above and below said intermediate electrode, passing an electrical current through the earth between said intermediate electrode and a distant grounded electrode and measuring and recording the variations in the potential difference between each of said pairs of electrodes.

9. The method of logging earth formations traversed by a well which comprises lowering an array of three vertically-spaced equidistant electrodes into said well, passing an alternating electrical current through the earth between the intermediate electrode and a distant grounded electrode, and measuring and recording the variations in the potential difference between the uppermost and the lowermost of said electrodes, whereby a log indicative of the discontinuities in the electrical properties of the strata penetrated by said well is obtained.

10. The method of logging earth formations traversed by a well which comprises lowering an array of three vertically-spaced equidistant electrodes into said well, passing an electrical current of substantially constant value through the earth between the intermediate electrode and a distant grounded electrode, and measuring and recording the variations in the potential difference between the uppermost and the lowermost of the electrodes in said array.

11. The method of logging earth formations traversed by a well which comprises continuously lowering an array of three vertically-spaced equidistant electrodes into said well, passing an electrical current through the earth between the intermediate electrode and a distant grounded electrode, and continuously recording the variations in the potential difference between the uppermost and the lowermost of the electrodes in said array.

12. The method of logging earth formations traversed by a well which comprises passing an electrical current through the earth between an electrode in said well and a distant grounded electrode and measuring and recording the ratio between the value of said electrical current and the potential difference between points above and below said electrode in said well.

13. The method of logging earth formations according to claim 12 wherein said electrical current is alternating current.

14. The method of logging earth formations traversed by a well which comprises continuously lowering an array of at least three vertically-spaced electrodes into said well, passing an electrical current through the earth between an intermediate electrode in said array and a distant grounded electrode, continuously recording the variations in the potential difference between electrodes in said array above and below said intermediate electrode on a moving recording medium and synchronizing the motion of said array of electrodes in said well and said recording medium.

15. Apparatus for logging earth formations traversed by a well comprising an array of at least three vertically-spaced electrodes, a distant grounded electrode, means for passing an alternating electrical current through the earth between an intermediate electrode in said array and said distant electrode, and means for measuring and recording the potential difference between electrodes in said array above and below said intermediate electrode.

16. Apparatus for logging earth formations traversed by a well comprising an array of three vertically-spaced equidistant electrodes, means for changing the level of said array in said well, a distant grounded electrode, means for passing an electrical current through the earth between the intermediate electrode in said array and said distant electrode, and recording means responsive to the potential difference between the uppermost and the lowermost of the electrodes in said array.

17. Apparatus for logging earth formations traversed by a well comprising an array of five vertically-spaced electrodes, one pair of said electrodes being spaced a relatively small distance above and below the intermediate of said electrodes and a second pair of said electrodes being spaced a relatively large distance above and below said intermediate electrode, means for raising and lowering said array of electrodes in said well, a distant grounded electrode, means for passing an electrical current through the earth between said intermediate electrode and said distant electrode, and means for measuring and recording the potential difference between each of said pairs of electrodes.

18. Apparatus for logging earth formations traversed by a well comprising an array of at least three vertically-spaced electrodes, means for raising and lowering said array in said well, a distant grounded electrode, means for passing an electrical current through the earth between an intermediate electrode in said array and said distant electrode, and means for measuring and recording the ratio between the value of said electrical current and the potential difference between a pair of electrodes in said array above and below said intermediate electrode.

19. Apparatus for logging earth formations traversed by a well comprising an array of at least three vertically-spaced electrodes, means for lowering said array in said well, a distant grounded electrode, means for passing an alternating electrical current through the earth between an intermediate electrode in said array and said distant electrode, means for continuously recording the variations in the potential difference between a pair of electrodes in said array above and below said intermediate electrode, and means for synchronizing said recording means and said lowering means.

PAUL F. HAWLEY.